United States Patent [19]

Lapeyre

[11] Patent Number: 4,614,953

[45] Date of Patent: Sep. 30, 1986

[54] SOLVENT AND MULTIPLE COLOR INK MIXING SYSTEM IN AN INK JET

[75] Inventor: James M. Lapeyre, New Orleans, La.

[73] Assignee: The Laitram Corporation, New Orleans, La.

[21] Appl. No.: 599,750

[22] Filed: Apr. 12, 1984

[51] Int. Cl.[4] .............................................. G01D 15/16

[52] U.S. Cl. .................................... 346/140 R; 346/75

[58] Field of Search .................. 346/1.1, 75, 140 PD; 400/126

[56] References Cited

U.S. PATENT DOCUMENTS

| | | | |
|---|---|---|---|
| 3,747,120 | 7/1973 | Stemme | 346/140 PD |
| 4,196,437 | 4/1980 | Hertz | 346/1.1 |
| 4,464,668 | 8/1984 | Komai | 346/75 |
| 4,494,128 | 1/1985 | Vaught | 346/140 PD |

FOREIGN PATENT DOCUMENTS

| | | | |
|---|---|---|---|
| 54-71636 | 8/1979 | Japan | 346/140 PD |
| 54-71637 | 8/1979 | Japan | 346/140 PD |
| 54-2728 | 10/1979 | Japan | 346/140 PD |

*Primary Examiner*—E. A. Goldberg
*Assistant Examiner*—M. Reinhart
*Attorney, Agent, or Firm*—Keaty & Keaty

[57] ABSTRACT

A color ink jet printing mechanism provides either continuous stream or drop on demand color ink jet printing utilizing a single stream flow of ink. A flow of colored ink is produced, pumped, and synchronized to the operation of a ink jet printer head drop producing mechanism. The ink is produced by mixture of an optional carrier fluid which flows past an injection port chamber, together with dyes which are synchronously injected, mixed with the carrier fluid, to form the colored ink. The ink is then ejected as a dot stream which is impacted upon a paper or other sheet material, forming a continuous flow of colored image. The mechanism uses a single flow of material; it is capable of a wider range of color tonalities, due to the premixing capabilities, than is possible using dithering techniques with three colored inks. The use of dyes rather than individual inks makes it economically feasible to provide a continuous stream ink jet printing head without the use of ink recirculation, thus reducing the overall cost and complexity of a continuous stream ink jet printer for color printing. The preferred embodiment of the invention provides a single ink jet head within which are placed a sequential series of piezoelectric pumped drive chambers for driving the carrier fluid, the dye injections, and the printer ink drop generator.

8 Claims, 3 Drawing Figures

SOLVENT AND MULTIPLE COLOR INK MIXING SYSTEM IN AN INK JET

BACKGROUND OF THE INVENTION

Within the field of computer technology, a growing need has arisen for the production of single page or mutliple page hard copy output from computers. The introduction of computers having extensive color graphics capabilities has led to a demand for a corresponding capability to produce color printed or plotted output sheets having both text and graphics features. Three major technologies have arisen to provide this color hard copy output capability.

The initial color plot capability was provided by the use of complicated pen plotting mechanisms, which create output by a process of repetitive line drawing using one of a selection of colored ink pens on a sheet of material, usually paper or film. Such output is constrained, by the mechanics of the system, to be a line plot. Shaded areas and color toning are not possible with such a system.

More recently a series of dot matrix color printers have been developed, utilizing an extension of known black and white dot matrix printing techniques, whereby a printhead containing a plurality of fine wires is traversed laterally across an output sheet. The wires are propelled forward in a controlled sequence as the printhead transitions across the sheet, impacting through an inked ribbon, forming characters from a series of dots created by the impact wire upon the output sheet. Since the text characters formed are formed from a regular sequence of dots within an overall matrix controlled by the systems software, this has come to be known as dot matrix printing. An extension to this technology provides a color output capability by providing an ink ribbon having multiple colors which is positioned under the ink printhead once for each color to be printed. Dot matrix printers are known to be relatively slow, high wear mechanisms that generate a great deal of noise. In addition, when color is involved, the necessity of making multiple passes for each line, one for each color, creates a time consuming process. Registration errors of the dot matrix printhead during each of the passes create areas having incompletely filled dots for a blurred appearance. Wear and aging of the ink ribbon produces a faded color appearance, which is quite noticeable.

More recently an alternate series of hard copy print output devices has been developed using what is known as ink jet technology. As with dot matrix printers, ink jet printers produce their output copy by transitioning a printhead laterally across a sheet of paper or similar material upon which the image is to be fixed. The ink jet plotter creates the image by emitting, in a controlled fashion, a jet of individual droplets of ink. These drops form the image upon the output sheet, much in the manner that a dot matrix printer forms the image. Ink jet plotters or printers have certain specific advantages. They are essentially noiseless. They can be transitioned at a much higher rate of speed, which means a higher print speed, because there is no necessity for physical contact of the printhead with the output sheet and because the number of moving parts within the plotter or printer has been significantly decreased from that of a dot matrix unit. Because the plotters print by means of a multiple droplet spreading effect, droplets can be merged or oversprayed so as to produce an increased shading capability; in color printing an increased range of colors can be shown. Additionally, the spreading of drops produces a more solid image than has been possible with the previous two technologies.

With ink jet plotters, color capability is provided by one of two technologies. Both require independent chambers for each of the colors of inks provided. An airtight ink cartridge is used to feed ink to channels aligned in rows on the printhead. Each channel has a separate orifice from which drops of ink are selectively extruded and deposited upon the paper. A slight negative pressure within each channel keeps the ink from inadvertently escaping through the orifice, and also forms a slightly concave meniscus at the orifice serving to keep the orifice clean. Such color ink units primarily use the three primary subtractive colors: cyan, yellow and magenta. These inks can produce, in general, up to one hundred and twenty-five shades or color combinations.

The first technology or Drop on Demand provides the drops of ink for impact upon the paper by means of a pulsed pumping or jet mechanism within each chamber, usually in the form of a piezoelectric pump which creates small pressure pulses within the orifice causing the ejection and formation of a flying drop which crosses the space between the printhead and the printed sheet, impacting upon the printed sheet. The overall formation of the images is under the control of software or computer control which controls the individual formation of drops as required to create the desired image.

The dot resolution of the printhead is dependent upon the spacing of the individual color orifices; the closer and smaller the orifices, the greater the resolution and the more detailed the plot than can be produced. Since this technology requires separate ink channels for each colored ink, the fact that there are at least three channels required to produce the colors tends to degrade the overall resolution that can otherwise be achieved.

An alternative form of printhead, the Continuous Stream printhead, is considered faster than Drop on Demand printing and produces somewhat higher quality print and graphics. This method uses a single channel upon the printhead for each color and an oscillating pump which produces a continuous stream of drops. The drops of ink are electrically charged and are then directed to the position on the paper or the printed sheet by means of deflection electrodes. Where no print is desired, the drops are deflected into an ink capturing mechanism or gutter from whence the ink is either recycled or disposed of. The resolution of such a head is not degraded by the use of multiple ink colors; however, each separate color must of necessity have its own individual focusing, deflection, and gutter system in order for the Continuous Stream head to function correctly. Further, a Continuous Stream system wastes a great deal of ink. The consumption of ink is much higher in a Continuous Stream than in a Drop on Demand ink jet head.

SUMMARY OF THE INVENTION

The current invention provides an improved color ink jet head mechanism for use within a computer printer of the ink jet type.

The invention provides a single channel flow, with real time mixing of ink of an appropriate color hue and shade for use in either a Drop on Demand or a Continuous Stream ink jet printer head. The invention has two principal embodiments. In the first, the invention comprises a first ink suspension medium driving chamber driving a continuous flow of a dye supporting medium through a mixing chamber. Within the mixing chamber, appropriate color dyes are synchronously injected so as to provide a section, within the continuous flow of ink, of the appropriate color hue. The ink is then driven and ejected as droplets from the inkhead onto a receiving printed sheet for the formation of color images and characters. In the second, there is no dye supporting medium or carrier fluid; the ink is formed by direct injection and mixing of inks or dyes of the appropriate subtractive colors. In the first embodiment, the default color is preferably clear (non-printing); in the second, the default color preferably is black.

It is thus an object of this invention to provide an improved ink jet printer head having a single path and flow for the controlled generation of colored inks for color printing.

It is a further object of this invention to provide an improved ink jet printer head for providing a single channel, color capable Continuous Stream printer head.

It is a further object of this invention to provide an improved color printing head for an ink jet printer providing a single source channel of ink to a drop on demand color ink jet head manifold.

It is a further object of this invention to provide a color, ink jet printer head capable of creating or generating a wider range of hues or tone than has heretofore been possible.

This and other objects of the invention will be more readily seen from the detailed description of the preferred embodiment which follows.

MATERIAL INFORMATION DISCLOSURE

Bok, et al, U.S. Pat. No. 4,283,731 disclose a standard black and white ink jet printing head as incorporated within an overall apparatus for generation of a continuous stream of printed labels and the like.

Mathis, U.S. Pat. No. 3,701,998 discloses a printing head, using electrostatic drop control, as used within Bok.

Isayama, et al, U.S. Pat. No. 4,178,597 disclose a print head construction technique for a color ink jet printhead utilizing three separate ink supplies, three separate drive controllers, and three separate ink ejector units. Isayama discloses a significant false color problem occurring within the use of three separate ink jet projector units during color transition periods and discloses a novel and complex timing method for overcoming this problem.

Freytag, et al, U.S. Pat. No. 3,889,271 identifies particularly suitable subtractive color inks for ink jet processes, noting that the ink suggested are aqueous and also notes that the dyes disclosed do not significantly change the viscosity or the physical parameters of the creative ink.

Heinzl, U.S. Pat. No. 4,320,406 described an integrated color printing head in which the individual dyes are separately fed to a sub-set of an overall array of ink jet emitting orifices forming thereby co-located sets of orifices for each of the colors desired to be printed, providing a more compact unitized printhead than the triple printhead shown in for instance, Isayama.

Maxwell, et al, U.S. Pat. No. 4,389,503 disclose an alternate opaque ink composition for an ink jet printer utilizing a series of solvent based inks.

Savit, U.S. Pat. No. 4,382,262 discloses, as a comparison, an ink jet printing method wherein the color is formed upon the printed sheet by activating a precoated substrate upon the sheet.

DETAILED DESCRIPTION OF THE PREFERRED EMBODIMENT

Figure 1:
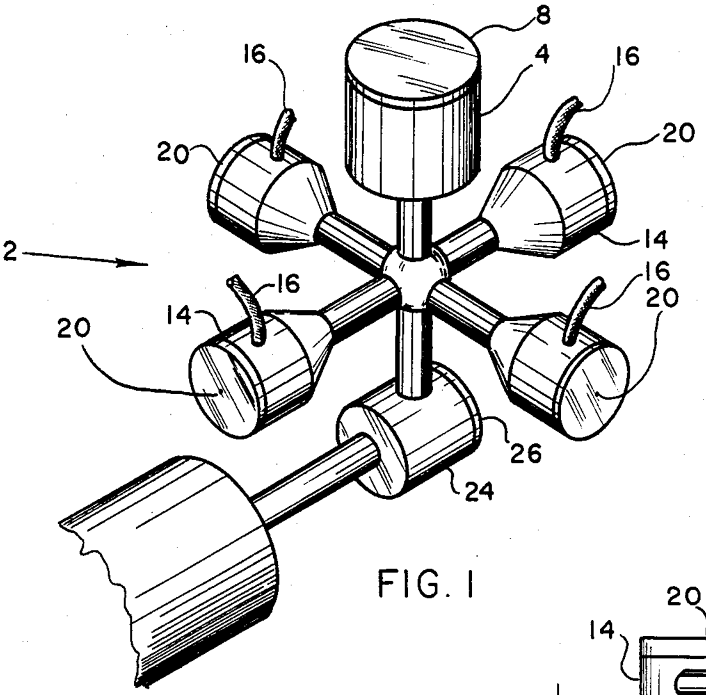
FIG. 1 is an angled view of the interconnected chamber mechanisms of the first preferred embodiment of the invention.
Figure 3:
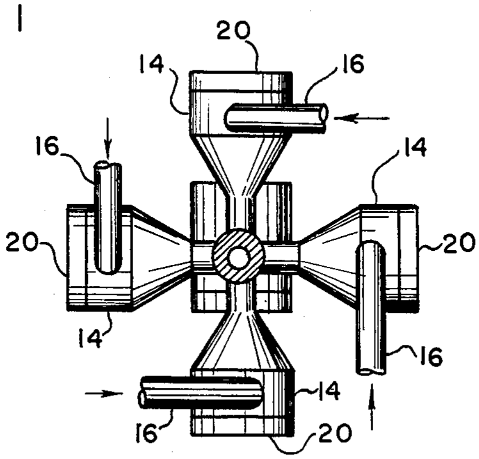
FIG. 3 is a top section view of the dye chambers in relation to the mixing line.
Figure 2:
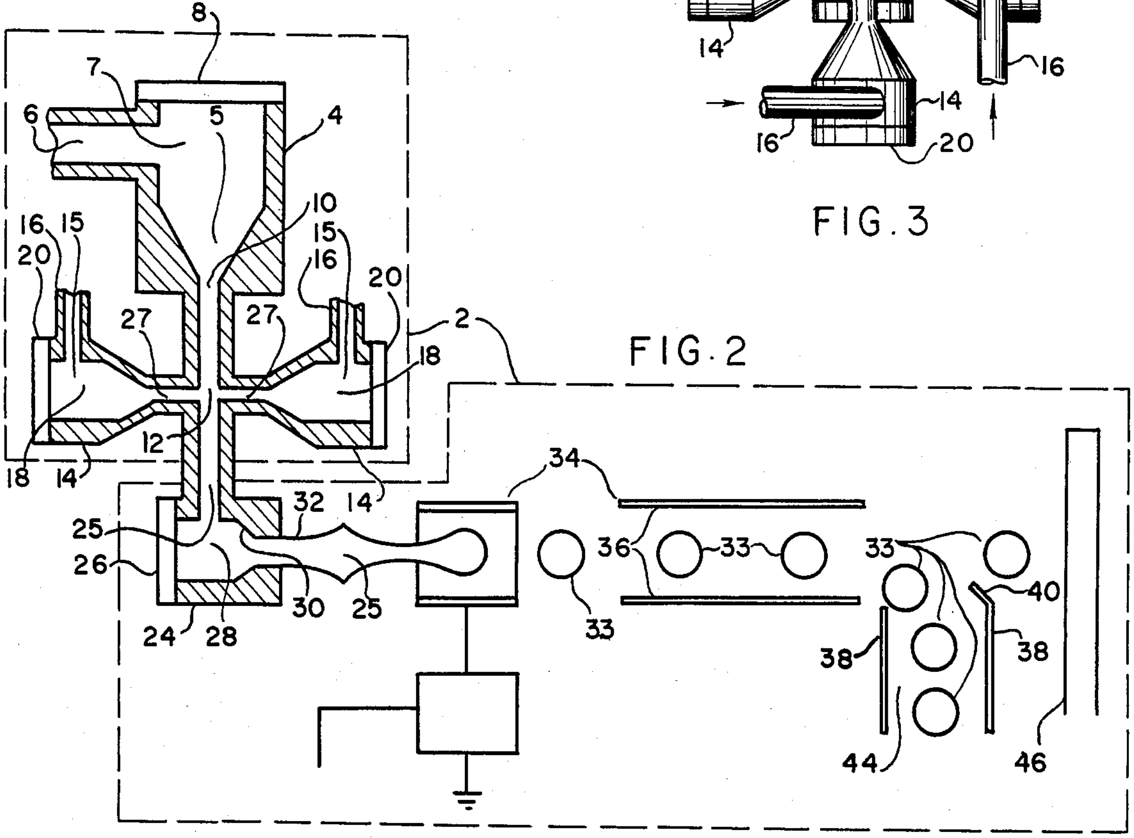
FIG. 2 is a cutaway side view of the first preferred embodiment of the invention, showing flow of the ink.

Referring to FIGS. 1 and 2, in conjunction the first embodiment of the overall inventive printhead 2 is shown to comprise first or primary chamber, hereinafter termed as as ink carrier chamber 4, a generally cylindrical structure containing therein under essentially air free conditions an ink solvent carrier solution 5. A continuous supply of the solvent carrier 5 is provided through a carrier feedline 6 from an external pressurized supply not shown. Supply of ink or dye from a source to a moving print head is old and will not be shown here. See, for example, Isayama, U.S. Pat. No. 4,178,597. The solvent carrier 5 is contained within the carrier chamber interior 7. One end of the generally cylindrical chamber 4 comprises a pressure drive means such as a drive piezoceramic member 8, which, as is well known, may be vibrated by the application of controlled electrical pulses to pulse the carrier solvent 5, pumping it from the interior of the chamber 7 out of the chamber 4 through the chamber ejector 10.

The chamber ejector 10 flowingly connects with a mixing conduit or mixing chamber line 12, fluidly filled with a solvent carrier 5.

Axially disposed about the mixing chamber line 12 are a plurality of secondary chambers, hereinafter termed as dye chambers 14. In general construction, dye chambers 14 are a somewhat smaller version of the carrier chamber 4. Each dye chamber 14 contains a specific color dye 15 such as the dyes disclosed in Freytag, et al U.S. Pat. No. 3,889,271. Each dye is supplied to its dye chamber 14 by dye feed line 16 from an external dye source not shown. Each dye 15 is fluidly contained, without the presence of air, within dye chamber interior 18. Dye chamber drive piezoelectric means 20, by means of synchronized electrical pulses, creates pulses of the dye 15 within the dye chamber interior 18, causing ejection controlled pulses of dye 15 through dye ejector 27 into mixing chamber line 12.

Mixing chamber line 12, further extending into ink drive chamber 24, combines and creates ink 25, comprised of a flowing mixture of the solvent carriers 5 and one or more of the dyes 15.

A tertiary chamber, hereinafter termed as ink drive chamber 24 comprises a generally cylindrical chamber having at one end drive piezoelectric means 26 for applying controlled pressure pulses to the ink 25 within the mixed ink drive interior 28. The interior 28 is fluidly connected through drive neck 30 to an ink jet ejector orifice 32.

Externally mounted to ink jet ejector orifice 32, coaxially disposed about the axial line of ejector orifice 32, is deflector apparatus 34. Deflector apparatus 34 is further comprised of a plurality of electrostatic deflectors 36 axially and symmetrically disposed about an outward extension of the central axis of the ejector orifice 32. An electrostatic·ink getter 38 is positioned on a single side of the extended axis of the ejector orifice 32 beyond the position of the electrostatic deflectors 36. Adjacently offset from getter 38 is ink gutter 40 fluidly connected to ink return 44.

Further along the extension of the axis of the injection orifice 32 is seen sheet 46, upon which printing is to be performed.

In operation, sheet 46 is printed upon by means of droplets of ink 25 as follows.

The preferred embodiment of the novel ink jethead herein described in a Continuous Stream ink jet and will be described as such. It will be obvious from the description that the head is equally suitable for a Drop on Demand ink jet printing head design, by removal of the getter 38, the gutter 40, the ink return 44, all as will hereinafter be shown.

For a Continuous Stream ink jet printerhead, the carrier chamber 4, dye chambers 14, mixing chamber line 12, and drive chamber 24 are all contained within a single unitized body, comprising the ink jet printer head 2.

Visualization of the printer head 2 has been omitted from the FIG. 1 and FIG. 2 drawings so as to clarify the position and functioning of the carrier chambers 4, dye chamber 14, drive chamber 24 and mixing chamber line 12.

Control electronics, of a standard design not shown, provide a controlled continuous series of pulses to the drive piezoelectric 8 of the carrier chamber 4 thus propelling a continuous pulsed flow of the solvent carrier 5 from within the interior of the carrier chamber 7 through the carrier ejector 10. This in turn produces a continuous pulsed flow of solvent carrier 5 within the mixing chamber line 12, proceeding from the carrier chamber 4 into the drive chamber 24.

As the pulsed flow of the carrier 5 proceeds in the mixing chamber line 12 past the dye chambers 14, synchronized actuation of the individual dye drive piezoelectric means 20 eject the individual dyes 15 from the dye chamber interiors 18 through the dye ejectors 27 into the mixing chamber line 12 thus forming within the mixing chamber line 12 a mixed ink 25 of a color dependent upon the choice of the individual dyes 15 and the amount injected per unit time into the flow of the carrier 5.

It can be readily seen, manipulation of the drive rate to the individual drive piezoelectric means 20 of the dye chambers 14 controls the amount of dye 15 injected; thus by controlled injection the individual dyes 15 may be varied so as to vary both the color or hue of the ink 25 as well as the intensity or chromaticity of the ink 25.

The relative sizes of the mixing chamber line 12 and the subsequent drive chamber mixed ink drive interior 28 are maintained such that a continuous flow of the ink 25 is maintained without significant mixing or blurring of the different colors sequentially provided within the flow of the ink.

Thus, the drive chamber 24 is sized to the minimum size necessary so as to provide a sufficient mass of mixed ink 25 within the mixed ink drive interior 28 so that the piezoelectric drive means 26 of the drive chamber 24 can develop sufficient drive pressure through the drive neck 30 to eject droplets of the mixed ink 25 through the ejector orifice 32. It will be obvious that the individual ink droplets 33 will be ejected substantially along the outer axis of the ejector orifice 32.

The electrostatic deflector apparatus 34, which comprises opposed plates of electrostatic deflectors 36 is capable, as is well known in the art, of deflecting the path of the droplets 33 from the outer extended axis of the ejection orifice 32 by means of application of differential electrostatic forces to the droplets. It is essentially well known in the art that the design of the electrostatic deflectors 36 permits the ink droplets 33 to be controlled so as to form a desired pattern upon the printed sheet 46 to form characters, graphics, and the like.

Since the above described preferred embodiment of the invention is of the class of printheads known as a Continuous Stream printhead, an electrostatic getter 38 is provided to remove unwanted droplets 33, which are ejected otherwise in a continuous flow from the printhead 2, capturing such unwanted droplets 33 in ink gutter 40. Ink return 44 is used to empty ink gutter 40 so as to provide a continuous operational capability. It should be noted that in the specific first embodiment of inventive head 2 disclosed herein the individual dye chambers 14 may be synchronized with the ink getter 38 so as to essentially eliminate the dispersal of dye carrier solvent 5 when no print is desired. That is the mixed ink 25 will consist only of carrier 5 when no printing is desired and the getter 38 is capturing the droplets 33. This would provide a considerable saving, over current Continuous Stream color printheads, inasmuch as essentially none of the expensive dyes 15 are wasted and only the carrier solvent 5, which may be water, is recirculated.

It can readily be seen that the inventive head 2 is equally adaptable to the Drop on Demand technology by proper synchronization of the carrier drive 8, the dye drives 20 and the drive chamber driving means 26 so as to stop all fluid flow within the head 2 except when ejection of a droplet 33 is required. Under these circumstances, the getter 38 and the ink gutter 40 and the ink or solvent return 44 are not required.

It can readily be seen from the above description of the first preferred embodiment of the invention that this invention is capable of numerous variants, providing either a unitized head as described or a multipart structure. A specific second embodiment is disclosed below. It is also clear that a multiple array of printing orifices as disclosed in Heinzl U.S. Pat. No. 4,320,406 may equally readily be supplied by the structure disclosed and shown, obviating the necessity in Heinzl of having a plurality of individually controlled ink chambers.

In the second preferred embodiment, carrier solvent 5 is not utilized, and carrier chamber 4, carrier drive 8, carrier feed 6, and carrier ejector 10 are omitted. The overall colored ink droplets 33 are formed by mixture of dyes 15, which, in this embodiment may be subtractive color inks.

It should be noted that mixing chamber line 12, together with drive chamber interior 28 defines a small but finite volume, which must be fluid filled to pass the last required colored ink droplet 33 to ejection. As stated above, this volume is filled with colorless carrier fluid 5 in the first preferred embodiment, and the "default" color is therefore clear. In the second preferred embodiment described, the residual fluid is formed by injection of one or more dyes 15; the best such default is black ink. This is particularly of utility for printers intended for intermixed graphics within text, as text printing requires black ink, and it can thus be expected that printing will commence and finish in a black ink mode.

It should also be apparent to those skilled in the art that the multiple dye chambers 14, by means of careful control and fineness of pulsing of the drive means 20, may be used to provide mixed inks 25 of a much wider range of hues and chromaticity than are now available through the use of the three standard ink jet ink colors which can only be mixed by interspraying or dithering units of essentially a uniform droplet size.

It is thus clear that the above described invention comprises not only the embodiments specifically disclosed in the preferred embodiment but the wider range of variants implicit in the claims which follow.

I claim:

1. An ink jet printer head apparatus, comprising:

a primary chamber adapted to receive a continuous supply of an ink solvent carrier;

a plurality of secondary chambers, each adapted to receive a supply of different color ink;

a mixing conduit mounted in fluid communication with the primary and secondary chambers and adapted to receive a continuous pulsed flow of the ink solvent carrier and a preselected amount of the ink;

means to provide a continuous pulsed flow of the ink solvent carrier to said mixing conduit;

means to provide controlled pressure pulses within each secondary chamber to eject a preselected amount of ink into the mixing conduit;

a tertiary chamber mounted in fluid communication with the mixing conduit and adapted to receive the mixed color ink from said mixing conduit; and means to provide pressure pulses within said tertiary chamber to continuously eject a desired color mixture.

2. The apparatus of claim 1, wherein the ink drive chamber is provided with an ejector orifice to eject a preselected amount of color ink out of the chamber.

3. The apparatus of claim 1, wherein the means to provide a continuous pulsed flow of the ink solvent carrier to the mixing conduit means is a piezoelectric member mounted on the primary chamber opposite a chamber ejector, said chamber ejector being in fluid communication with the mixing conduit.

4. The apparatus of claim 1, wherein means to provide controlled pressure pulses within each secondary chamber is a piezoelectric drive means adapted to provide electrical synchronized pulses of the ink within each chamber interior, thereby ejecting a controlled amount of ink into the mixing conduit.

5. An ink jet printer head apparatus, comprising:

a plurality of chambers adapted to receive different color inks;

means to provide controlled pressure pulses within each chamber;

a mixing conduit adapted to receive a preselected amount of ink from the chambers;

an ink drive chamber mounted in fluid communication with the mixing conduit; and a means to provide pressure pulses, upon demand, within the ink drive chamber to eject the desired mixed color ink.

6. The apparatus of claim 5, wherein means to provide controlled pressure pulses within each chamber is a piezoelectric drive means adapted to provide electrical synchronized pulses of the ink within each chamber interior, thereby ejecting a controlled amount of ink into the mixing conduit.

7. A color ink jet attachment to a printer head, comprising:

a primary chamber having an inlet and outlet, said chamber adapted to receive, under air-free conditions, a continuous supply of an ink solvent carrier and to continuously eject a predetermined amount of the solvent through the outlet;

a plurality of secondary chambers, each adapted to receive a supply of a predetermined color ink, said chambers provided with an inlet to receive the supply of ink and an outlet to eject a controlled amount of color ink through the outlet;

a mixing line mounted in fluid communication with the outlets of the primary and secondary chambers, said mixing line receiving the flow of mixed solvent carrier and the ink and directing the flow to an ink drive chamber;

a piezoelectric means adapted to apply controlled pressure pulses to the ink and solvent carrier contained within the primary and secondary chambers to provide for a controlled color mixture within the mixing line; and a drive piezoelectric means mounted on the ink drive chamber for applying controlled pressure pulses to the color ink contained within the ink drive chamber to eject the ink through an ejector orifice from the ink drive chamber.

8. An ink jet printer head apparatus, comprising:

a primary chamber adapted to receive a supply of ink solvent carrier;

a plurality of secondary chambers each adapted to receive a supply of different color ink;

means to provide controlled pressure pulses within each primary and secondary chambers;

a mixing conduit mounted in fluid communication with the primary and secondary chambers and adapted to receive a preselected amount of the ink solvent carrier and the color ink;

an ink drive chamber mounted in fluid communication with the mixing conduit; and a means to provide pressure pulses, upon demand, within the ink drive chamber to eject the desired mixed color ink.

* * * * *